United States Patent [19]

Willis

[11] 4,030,936

[45] June 21, 1977

[54] BINDER FOR ALUMINA CONTAINING REFRACTORIES

[76] Inventor: Melvin M. Willis, 5232 Kentwater Pl., Yorba Linda, Calif. 92686

[22] Filed: July 7, 1975

[21] Appl. No.: 593,210

[52] U.S. Cl. ................................. 106/65; 106/85
[51] Int. Cl.² ..................................... C04B 35/10
[58] Field of Search ........................... 106/65, 85

[56] References Cited

UNITED STATES PATENTS

| | | | |
|---|---|---|---|
| 1,365,077 | 1/1921 | Ashenhurst | 106/85 |
| 2,619,426 | 11/1952 | Greger | 106/85 |
| 3,274,008 | 9/1966 | Braunwarth et al. | 106/65 |
| 3,582,372 | 6/1971 | Criss et al. | 106/65 |

*Primary Examiner*—J. Poer
*Attorney, Agent, or Firm*—Edgar W. Averill, Jr.

[57] ABSTRACT

A refractory composition is disclosed herein comprising an alumina-containing refractory mix and a phosphoric acid type binder. The binder contains sodium sulfate and aluminum sulfate in addition to phosphoric acid or its precursor such as phosphorous pentoxide.

10 Claims, 1 Drawing Figure

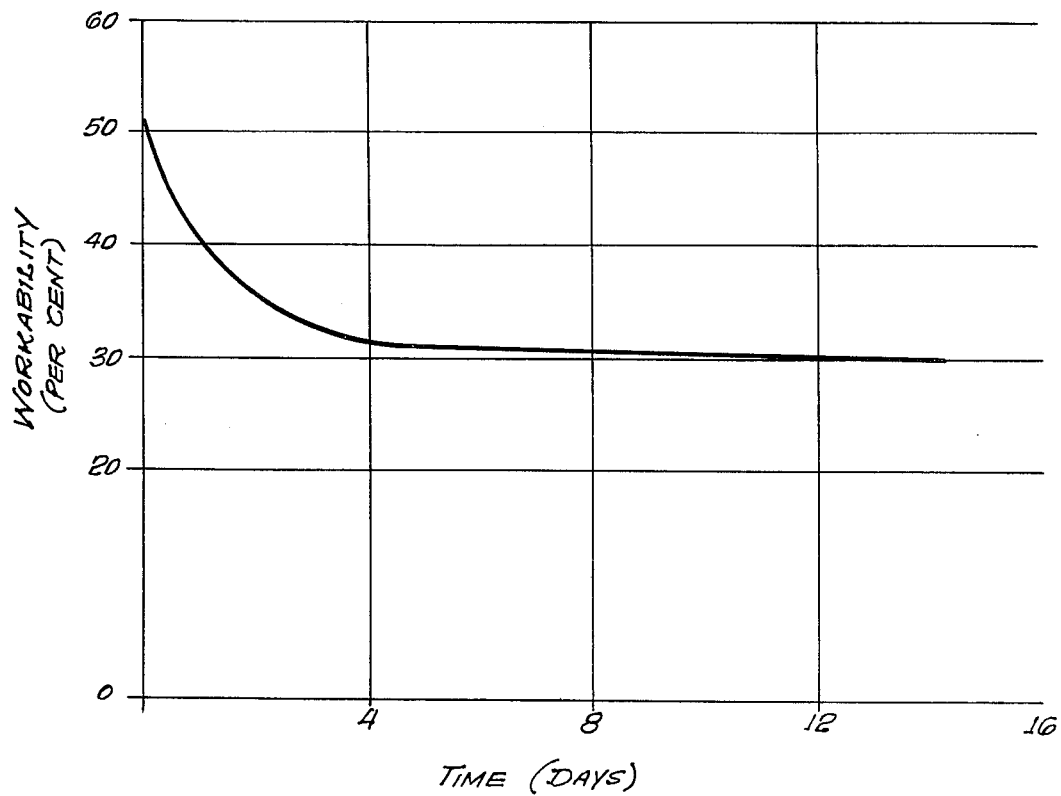

BINDER FOR ALUMINA CONTAINING REFRACTORIES

BACKGROUND OF THE DISCLOSURE

The field of the present invention is refractory mixes and more specifically relates to refractory ramming mixes which are useful for the preparation of monolithic linings for furnaces, kilns, hot metal ladles and other refractory applications where resistance to high temperature is required. The present invention is not limited to ramming mixes, however, and may also be applied to the fabrication of refractory bricks and refractories of other structural shapes.

Mixes containing a high percentage of alumina are formed into a refractory composition by the addition of a binder such as phosphoric acid followed by drying and firing steps. Other ingredients such as clay are often added to improve the plasticity of the mix and relatively pure alumina and natural minerals containing a high percentage of alumina generally make up a large part of the refractory composition.

In order to fabricate a monolithic or other refractory surface of the type discussed herein, the dry ingredients (e.g., the high alumina mix) are mixed and the binder (typically a liquid having a relatively high viscosity) is mixed with th dry ingredients. A plastic or moldable mix results which is usually wrapped in a plastic sheet to prevent drying. Alternatively the plastic mix may be used shortly after mixing to permit forming the desired shape. This plastic mix is next allowed to dry at a relatively low temperature and then fired at a temperature usually in excess of 2,000° F. to form the final refractory. During this firing step the binder and alumina react to form a strong refractory.

In the past, refractory mixes such as those described above have had several shortcomings. The use of phosphoric acid as a binder has often led to cracking upon drying. Furthermore, there has been a need for higher strength after firing. Attempts to modify the phosphoric acid to form an improved binder has led to high processing costs. Furthermore, such binder modifications have often led to undesirable air set properties. Further improvement in the resistance of the fired refractory to alkali attack is also needed for many end uses. The shelf stability of many prior art mixes has been limited resulting in a loss of bonding strength after prolonged storage of the plastic ramming mix. This is also manifested in a hardening or setting of the mix prior to use, making it impossible to form the mix into a desired shape. Lastly, there is a need to decrease the cost of the binder composition over both the modified phosphoric acid type binder and phosphoric acid itself.

SUMMARY OF THE INVENTION

It is an object of the present invention to provide a binder for alumina-containing refractory mixes.

It is another object of the present invention to provide a low cost refractory binder.

It is a still further object of the present invention to provide an alumina based ramming mix having improved shelf stability.

Yet another object of the present invention is to provide a refractory having improved resistance to alkali attack.

These and other objects of the present invention are brought about by the use of a novel binder containing phosphoric acid or a precursor thereof such as phosphorus pentoxide together with aluminum sulfate and sodium sulfate. The proportions of the ingredients of the binder may be as follows:

| | |
|---|---|
| 8 moles | $H_3PO_4$ |
| 0.5 to 1.5 moles | $Al_2(SO_4)_3$ |
| 0.5 to 5 moles | $Na_2SO_4$ |

A preferred range of $Al_2(SO_4)_3$ is 0.75 to 1.2 moles for 8 moles of 75% $H_3PO_4$. About 1 mole of $Al_2(SO_4)_3$ is believed to be an optimum level for use in most general purpose ramming mixes. A preferred range of $Na_2SO_4$ is between 0.75 and 2.5 moles for each 8 moles of 75% $H_3PO_4$ with 1 mole again being an optimum level for most ramming mixes.

By use of binder formulations in the range listed above a refractory with increased sintering can result which causes reduced exposed surface area which, in turn, in believed to decrease the amount of alkali attack of the fired refractory. These formulations are also of particularly low cost since aluminum sulfate and sodium sulfate are low cost raw materials. The compression strength of the resulting refractory at 2,000° F. is greater than refractories resulting from the use of phosphoric acid alone. It has been observed that refractories using the binder of the present invention exhibit increased shelf stability as compared to straight phosphoric acid binder formulations and this is believed to be a result of the presence of a sodium salt which tends to stabilize the phosphoric acid. The amount of air set obtainable can be varied and by increasing the amount of water, the tendency to air set is increased. The ingredients of the present invention can be dry mixed and only water need be added. In this way the expensive processing steps required with many prior art binder formulations is eliminated. Alternatively the ingredients can be supplied in liquid form. When a dry mix is prepared, care must be taken to eliminate moisture from the dry ingredients since an exothermic reaction can occur with the phosphorous pentoxide.

BRIEF DESCRIPTION OF THE DRAWING

The drawing is a graph depicting workability expressed in percent versus time expressed in days.

DESCRIPTION OF THE PREFERRED EMBODIMENTS

The following examples illustrate the present invention.

EXAMPLE 1

The following ingredients were used in the refractory composition of Example 1:

10 lbs High Alumina refractory grog with high iron content
2 lbs 1/4-8 mesh tabular alumina
5 lbs $A_2$ - 325 (tabular alumina below 325 mesh)
0.72 lbs Western Bentonite (clay)
0.13 lbs $Al_2(SO_4)_3$
0.066 lbs $Na_2SO_4$
0.44 lbs 75% $H_3PO_4$ All dry ingredients were mixed in a small Simpson mixer for 2 minutes. The phosphoric acid was then slowly added and the mixture was mixed an additional 2 minutes. Workability was measured by ASTM test number C-181-47 which measures the amount of deformation created by a known force. The workability of the above mix was 50% in two hits. A moisture loss of 8.6% by weight was observed after holding a sample at 400° F for a period of 30 minutes. The pH was 2.3 and the percentage shrinkage at both 230° F. and 2,000° F. was nil. There was a shrinkage of 1.35% at 2,900° F. It should be noted that the above formulation utilized a refractory grog with high iron content and would be expected to function well with a more iron-free grog.

The compression strength after firing at 2,000° F. was 14,300 psi and after firing at 2,900° F. was 16,300 psi. The binder level in the above formulation is 6.3% which is believed to be a preferable level for most applications. The molar ratio of the ingredients in the binder above are 1 mole $Al_2(SO_4)_3$, 1.2 moles $Na_2SO_4$ and 8.8 moles $H_3PO_4$. This is close to the ratio of the chemical formula shown below which is believed to be the preferred ratio.

EXAMPLE 2

The following example was run with a higher level of binder, namely, 10.3% (considering 75% $H_3PO_4$ as binder). The identical amounts of high alumina refractory grog, tabular alumina, less than 325 mesh alumina and Western bentonite were added to 0.344 lbs $Al_2(SO_4)_3$; 0.17 lbs $Na_2SO_4$; and 1.10 lbs of 75% $H_3PO_4$. An additional 350 ml of $H_2O$ was also added for workability. The mixing procedures was as described for Example 1. The molar ratios of this binder are 1 mole $Al_2(SO_4)_3$, 1.2 moles $Na_2SO_4$ and 8.4 moles $H_3PO_4$.

The percent workability was 50% in one hit. The air setting characteristics of the above mix are slow but good air setting results. It was noted that increased water improves air set properties. Three samples were fired at 2,000° F. and no linear change or shrinkage was observed. The compression strength after firing at the indicated temperatures was:

| Temperature | Compression Strength |
|---|---|
| 2,000° F. | 8,200 psi |
| 2,600° F. | 10,200 psi |
| 2,900° F. | 15,750 psi |

The pH was 2.3 and the moisture loss was 8.3%

EXAMPLE 3

The following ingredients were mixed in a manner similar to that described for Example 1:
5 lbs High Alumina refractory grog with high iron content
1 lb 1/4-8 mesh alumina
2.5 lbs $A_2$-325 (below 325 mesh alumina)
0.40 lbs Western Bentonite (clay)
0.17 lbs $Al_2(SO_4)_3$
0.17 lbs $Na_2SO_4$
0.57 lbs 75% $H_3PO_4$
200 ml water The above formula results in a 10.3% binder level with twice the amount of sodium sulfate as that used in Examples 1 and 2. The molar ratios are 1 mole of $Al_2(SO_4)_3$, 2.4 moles $Na_2SO_4$ and 8.8 moles $H_3PO_4$. The workability was excellent but the sample was somewhat too wet. The moisture loss was 8% and the pH was 2.3. The compression strength after firing at 2,000° F. was 12,400 psi. No shrinkage was observed after heating to 230° F. or to 2,000° F.

EXAMPLE 4

A binder comprising one part by weight of aluminum sulfate, one part by weight sodium sulfate and 2.5 parts by weight 75% phosphoric acid was added to an 85% alumina refractory mix. The binder level was 10.3% by weight. The molar ratio of ingredients in this binder was 1 mole $Al_2(SO_4)_3$, 2.4 moles $Na_2SO_4$ and 6.5 moles of $H_3PO_4$. This formulation was compared with a standard commercial refractory formulation containing 85% aluminum refractory mix which contained a phosphoric acid type refractory binder. The results were as follows:

| | Example 4 | 85% Aluminum Refractory Mix |
|---|---|---|
| Compression strength (psi) | | |
| 230° F. | 3,930 | 3,800 |
| 2,000° F. | 11,100 | 8,100 |
| 2,900° F. | 5,800 | — |
| Based on mean of samples tested | | |
| Density No./ft³ at 2,900° F. | 161.5 | — |
| pH | 2.2 | 2.3 |
| Moisture loss (%) | 6.2 | 8.0 |
| Workability (%) | 50 | 45 |
| Shrinkage (%) at 2,900° F. | 0.45 | — |

A graph of the composition of Example 4 depicting workability in percent versus time in days is shown in the drawing. As noted above, the initial workability was 50% and after about 4 days the workability had essentially leveled off at 30%.

EXAMPLE 5

The following ingredients were mixed in the manner described for Example 1:
5 lbs High Alumina refractory grog with high iron content
1 lb 1/8-8 mesh tabular alumina
2.5 lbs below 325 mesh tabular alumina
0.4 lbs Western Bentonite (clay)
Binder:
  0.172 lbs $Al_2(SO_4)_3$
  0.172 lbs $Na_2SO_4$
  0.93 lbs 75% $H_3PO_4$
  0.045 lbs Boric Acid
  0.43 lbs Water (added for workability)

The workability of the above mixture was the same as that for the mixture of Example 3. The moisture loss was 8.55% and the compression strength after firing to 2,900° F. was 14,000 psi. The binder level of this example (excluding the additional water) was 12.5% by weight. The molar ratios are 8 moles $H_3PO_4$, 0.56 moles $Al_2(SO_4)_3$ and 1.35 moles $Na_2SO_4$.

EXAMPLE 6

The following ingredients were mixed in the manner described for Example 1:
10 lbs High Alumina refractory grog with high iron content
2 lbs 1/4-8 mesh tabular alumina
5 lbs below 325 mesh tabular alumina
0.8 lbs Western Bentonite (clay)
Binder:
  0.555 lbs $Al_2(SO_4)_3$
  0.231 lbs $Na_2SO_4$
  1.7 lbs 75% $H_3PO_4$
  0.22 lbs water (added for workability)

The workability was 48% in one hit at the time of completing the mix. The moisture loss was 6.75% and the pH was 2.3. The compression strength after firing to 1,500° F. was 8,775 psi. The molar ratios are 8 moles $H_3PO_4$, 1 mole $Na_2SO_4$ and 1 mole of $Al_2(SO_4)_3$. The binder level (excluding added water) was 12.3% by weight.

EXAMPLE 7

The binder of Example 5 was added to the following to give a binder level (excluding added water) of 11.7% by weight:
6.2 lbs below 6 mesh alumina
3.08 lbs below 325 mesh tabular alumina
0.36 lbs Western Bentonite
0.55 lbs water Workability after mixing was 50% in 2 hits. A sample was fired to 2,000° F. and no significant linear change was noted. The compression strength of this sample was 9,670 psi.

EXAMPLE 8

The binder of Example 2 was mixed with the refractory mix of Example 7 at a binder level of 11.9% by weight. The results were 50% workability in 2 hits and no observable linear change after firing at 200° F. The compression strength after firing to 2,000° F. was 8,550 psi.

EXAMPLE 9

The following binder was added at 8.5% by weight to the refractory mix of Example 7:
0.132 lbs $Al_2(SO_4)_3$
0.066 lbs $Na_2SO_4$
0.700 lbs 75% $H_3PO_4$ The workability was 50% in 3 hits and no linear change was observed after firing to 2,000° F. The compression strength after such firing was 14,400 psi. The molar ratio of the binder ingredients are 8 moles $H_3PO_4$, .6 moles $Al_2(SO_4)_3$ and .7 moles $Na_2SO_4$.

EXAMPLE 10

Example 9 was duplicated except that the amount of $Na_2SO_4$ was doubled. The workability was 50% in 2 hits and no linear change was noted after firing at 2,000° F. The compression strength after firing to 2,000° F. was 11,250 psi.

While not wishing to be bound by any theory, it is believed that the following chemical reaction takes place using the binder of the present invention:

$$2Al_2O_3 + Al_2(SO_4)_3 + Na_2SO_4 + 8H_3PO \rightarrow$$
$$AlH_3(PO_4)_2 \cdot 3H_2O + 2NaAl(SO_4)_2 \cdot 3H_2O +$$
$$Al_2(HPO_4)_3 + Al(H_2PO_4)_3$$

The binder of the present invention can be used at levels between 1 and 15% by weight with a level of about 6.3% being ideal. (Note: binder weights are expressed herein using 75% $H_3PO_4$ as part of the binder). It has been found that levels of binder near the upper range limit leads to increased sintering which in turn has led to improved alkali resistance particularly at levels between 10 and 15% by weight. It is believed that increased alkali resistance results from decreased surface area and a more impervious surface reducing the amount of access of the alkali to the internal matrix. It is also believed that the expelling of gas from the refractory on firing tends to seal the surface. The binder of the present invention when used at a level of about 10.3% results in a sintering or melting and sealing near the surface. It is believed that the aluminum sulfate of the present binder forms a gas at about 1,400° F. giving an excellent sealing result. Binder levels between 3 and 8% by weight are most useful for general applications with 6.3% being an optimum level in most formulations.

The amount of aluminum sulfate useful in the binders of the present invention is ideally the mole ratio shown in the chemical formula above—that is, one mole of aluminum sulfate, one mole of sodium sulfate and 8 moles of phosphoric acid. However, The molar amount of aluminum sulfate may be increased as much as 20% over the molar ratio if increased sintering is desired. Increased aluminum sulfate also leads to early strength particularly for those refractories fired at 2,000° F. or less. The amount of aluminum sulfate can be decreased to about 50% of molar and a satisfactory binder will still result although some loss of early strength will be noted.

The sodium sulfate also is ideally used at the molar amounts shown in the chemical formula above. By increasing the sodium sulfate the color is darkened which is disadvantageous for many uses. The sodium sulfate also leads to increased sintering and up to 500% molar amounts of sodium sulfate may be used. The sodium sulfate works with the aluminum sulfate to give high strength at low temperatures and it also has a stabilizing effect on the phosphoric acid. This stabilizing effect is believed to result from the presence of the sodium ion.

The present invention is useful with high alumina refractory mixes such as those containing about 85% alumina. Alumina levels between 75 and 90% by weight are particularly useful with the binders of the present invention.

While the above examples show 75% phosphoric acid being used this may be replaced by an equivalent amount of phosphorous pentoxide ($P_2O_5$) and water. The equivalent amount of water may be added during the last mixing operation. The ability to use phosphorous pentoxide which is a dry ingredient leads to an ability to have a completely dry binder mix to which only water need be added. Dry chemicals used must be free of all water. If moisture is present chemicals must be dried before mixing in order to prevent a reaction of the phosphorous pentoxide to phosphoric acid. In this way the binder can be shipped and stored in a dry condition and have no shelf instability. Likewise, the binder itself may be shipped to a remote location and added to refractory materials at the remote location together with water.

Another important feature of the present invention is the ability to furnish the ingredients in a concentrated, stable, liquid form. The following ingredients may be used in the ranges set forth below:

|  | % By Weight | |
| --- | --- | --- |
|  | Range | Typical |
| Aluminum Sulfate | 15 – 27 | 17 |
| Sodium Sulfate | 5 – 11 | 7 |
| 85% $H_3PO_4$ | 20 – 80 | 32 |
| Water | Balance | 44 |

The ingredients may be mixed to form a stable solution by heating the phosphoric acid to 90° C., adding the aluminum sulfate followed by the addition of the sodium sulfate. The mixture should be held at 90° C. and agitated until a solutions results. The water is then added to form a stable solution.

The present embodiments of this invention are thus to be considered in all respects as illustrative and not restrictive, the scope of the invention being indicated by the appended claims rather than by the foregoing description. All changes which come within the meaning and range of eqivalency of the claim therefore are intended to be embraced therein.

I claim:

1. A binder for alumina based refractories, said binder consisting essentially of:
   $H_3PO_4$: 8moles
   $Al_2(SO_4)_3$: 0.5 to 1.5 moles
   $Na_2SO_4$: 0.5 to 5 moles.

2. The binder of claim 1 wherein the $Al_2(SO_4)_3$ is between 0.75 and 1.2 moles.

3. The binder of claim 1 wherein the $Na_2SO_4$ is between 0.75 and 2.5 moles.

4. The binder of claim 1 wherein the $Al_2(SO_4)_3$ amount is about 1 mole.

5. The binder of claim 1 wherein the $Na_2SO_4$ amount is about 1 mole.

6. The binder of claim 1 wherein the $Al_2(SO_4)_3$ level is about 1 mole and the $Na_2SO_4$ level is about 1 mole.

7. A refractory mixture consisting essentially of an alumina containing mixture having between about 75 and 90 percent by weight of alumina and between 1 and 15 percent by weight of a binder consisting essentially of:
   $H_3PO_4$: 8 moles
   $Al_2(SO_4)_3$: 0.5 to 1.5 moles
   $Na_2SO_4$: 0.5 moles to 5 moles.

8. A refractory mixture for forming a refractory with improved resistance to alkali attack said mixture containing a high alumina refractory mix and between about 10 and 15 percent by weight of a binder consisting essentially of:
   75% $H_3PO_4$: 8 moles
   $Al_2(SO_4)_3$: 0.5 to 1.5 moles
   $Na_2SO_4$: 0.5 to 5 moles.

9. A binder comprising an aqueous solution, said binder consisting essentially of between 15 and 27 percent by weight of aluminum sulfate, between 5 and 11 percent by weight of sodium sulfate, between 20 and 80 percent by weight of 85% phosphoric acid and the balance of said solution being water.

10. The binder of claim 9 wherein said solution contains about 17% by weight of aluminum sulfate, about 7% by weight of sodium sulfate, about 32% by weight of 85% phosphoric acid and about 44% by weight of water.

* * * * *